(12) United States Patent
Hershkowitz

(10) Patent No.: US 6,719,462 B2
(45) Date of Patent: Apr. 13, 2004

(54) SPLICE PROTECTION SYSTEM

(75) Inventor: Elliott E. Hershkowitz, Fair Lawn, NJ (US)

(73) Assignee: Chemque, Inc., Rexdale (CA)

( * ) Notice: Subject to any disclaimer, the term of this patent is extended or adjusted under 35 U.S.C. 154(b) by 106 days.

(21) Appl. No.: 09/885,712

(22) Filed: Jun. 20, 2001

(65) Prior Publication Data

US 2002/0197029 A1 Dec. 26, 2002

(51) Int. Cl.[7] ............... G02B 6/00; G02B 6/36
(52) U.S. Cl. ................... 385/92; 385/147
(58) Field of Search .................. 385/95–99, 147

(56) References Cited

U.S. PATENT DOCUMENTS

| | | | | |
|---|---|---|---|---|
| 3,585,275 A | * | 6/1971 | Gillemot et al. .......... 174/76 |
| 4,025,717 A | | 5/1977 | Whittingham ........... 174/88 C |
| 4,186,986 A | | 2/1980 | Shoemaker ............... 339/114 |
| 4,257,630 A | | 3/1981 | Bartell et al. ............... 285/21 |
| 4,358,634 A | | 11/1982 | Dienes ..................... 174/88 R |
| 4,610,738 A | | 9/1986 | Jervis ........................ 156/49 |
| 4,666,537 A | | 5/1987 | Dienes ....................... 156/48 |
| 4,685,981 A | | 8/1987 | Dienes ....................... 156/48 |
| 4,707,200 A | * | 11/1987 | Giebel et al. ............... 156/48 |
| 4,732,628 A | | 3/1988 | Dienes ....................... 156/48 |
| 4,962,286 A | | 10/1990 | Jensen et al. ............... 174/92 |
| 5,613,298 A | | 3/1997 | O'Neill et al. ............. 29/869 |
| 5,792,989 A | | 8/1998 | Smith .................... 174/77 R |
| 5,962,811 A | | 10/1999 | Rodrigues et al. .......... 174/76 |
| 2002/0197029 A1 | * | 12/2002 | Hershkowitz ............... 385/99 |

* cited by examiner

*Primary Examiner*—Akm Enayet Ullah
(74) *Attorney, Agent, or Firm*—Banner & Witcoff, Ltd.

(57) ABSTRACT

A splice protection system including a water resistant material disposed on a flexible wrapper that retains the water resistant material is disclosed. The splice protection system is useful for preventing unwanted entry of external elements into the splice regions of signal transmission devices, thus preserving the integrity and function of the signal transmission devices.

15 Claims, 10 Drawing Sheets

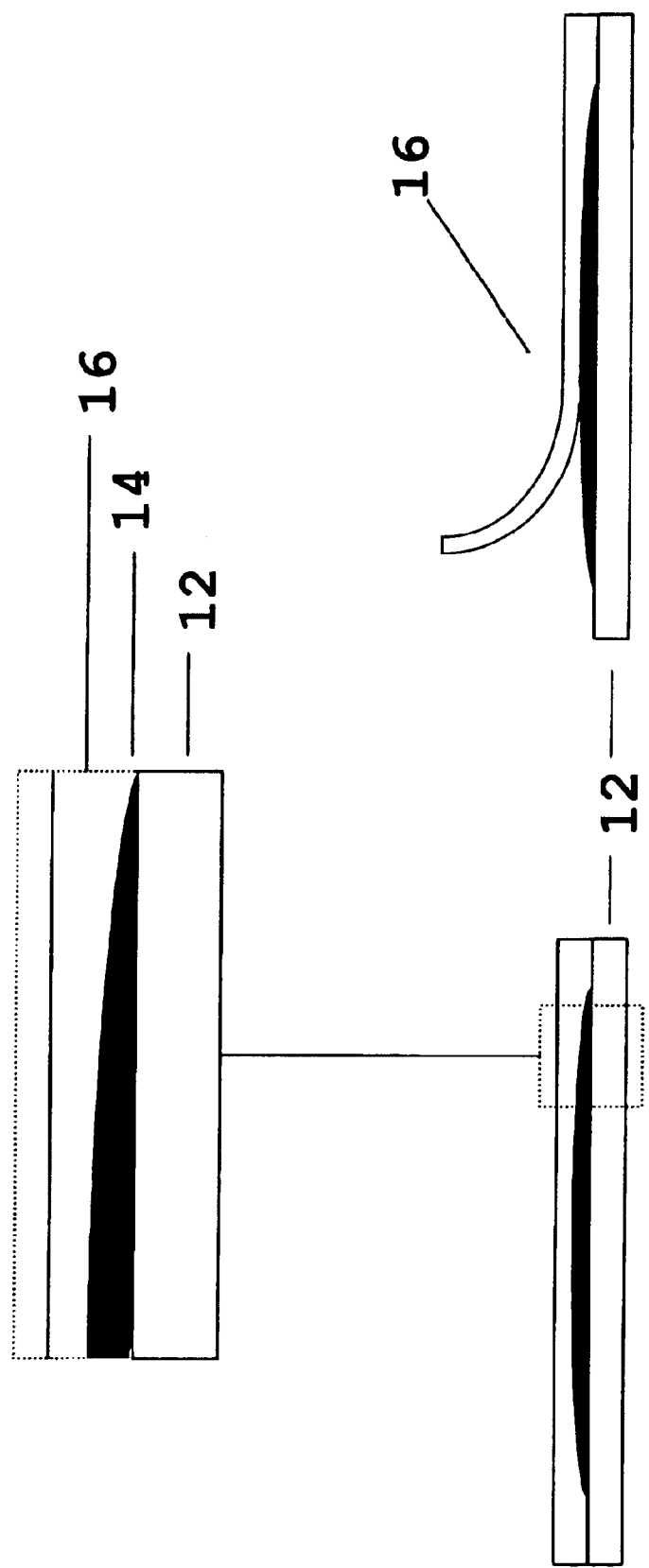

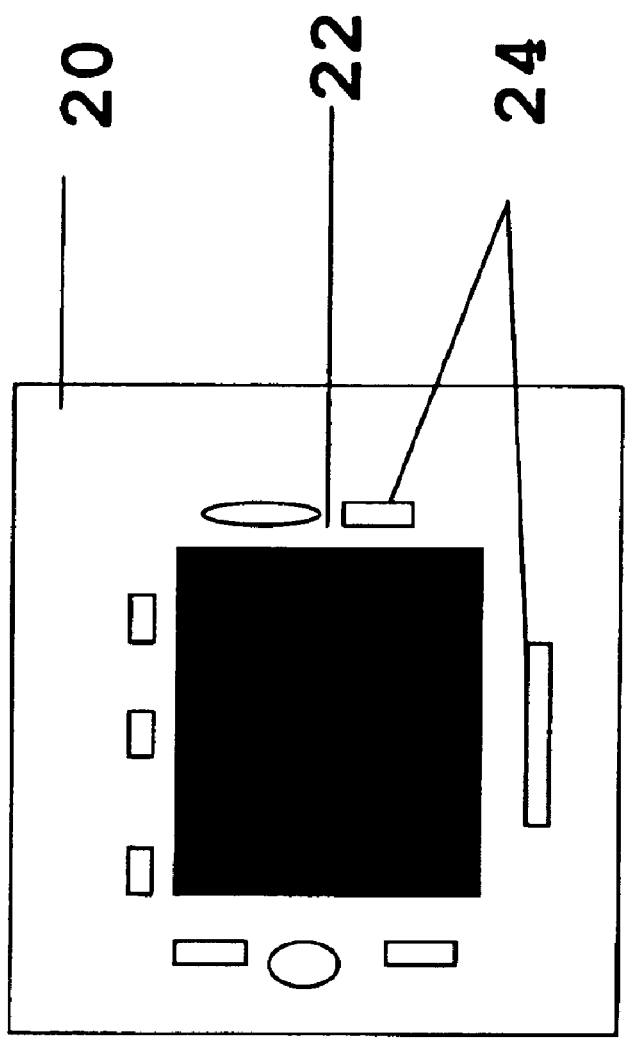

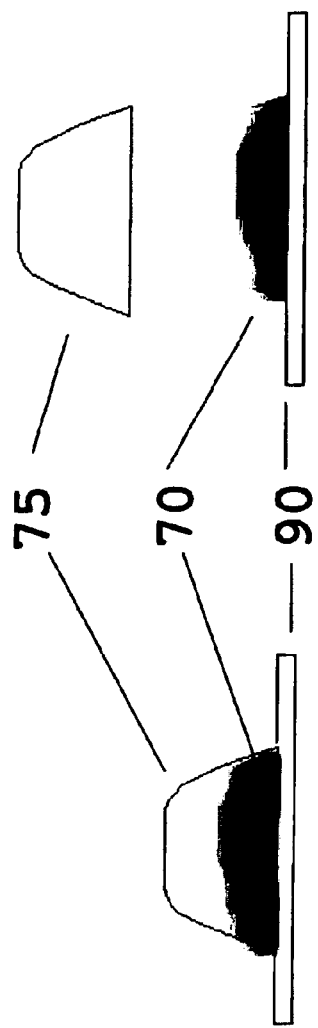
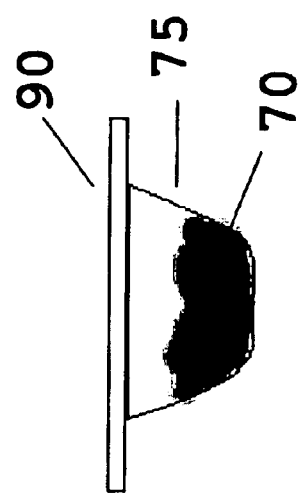

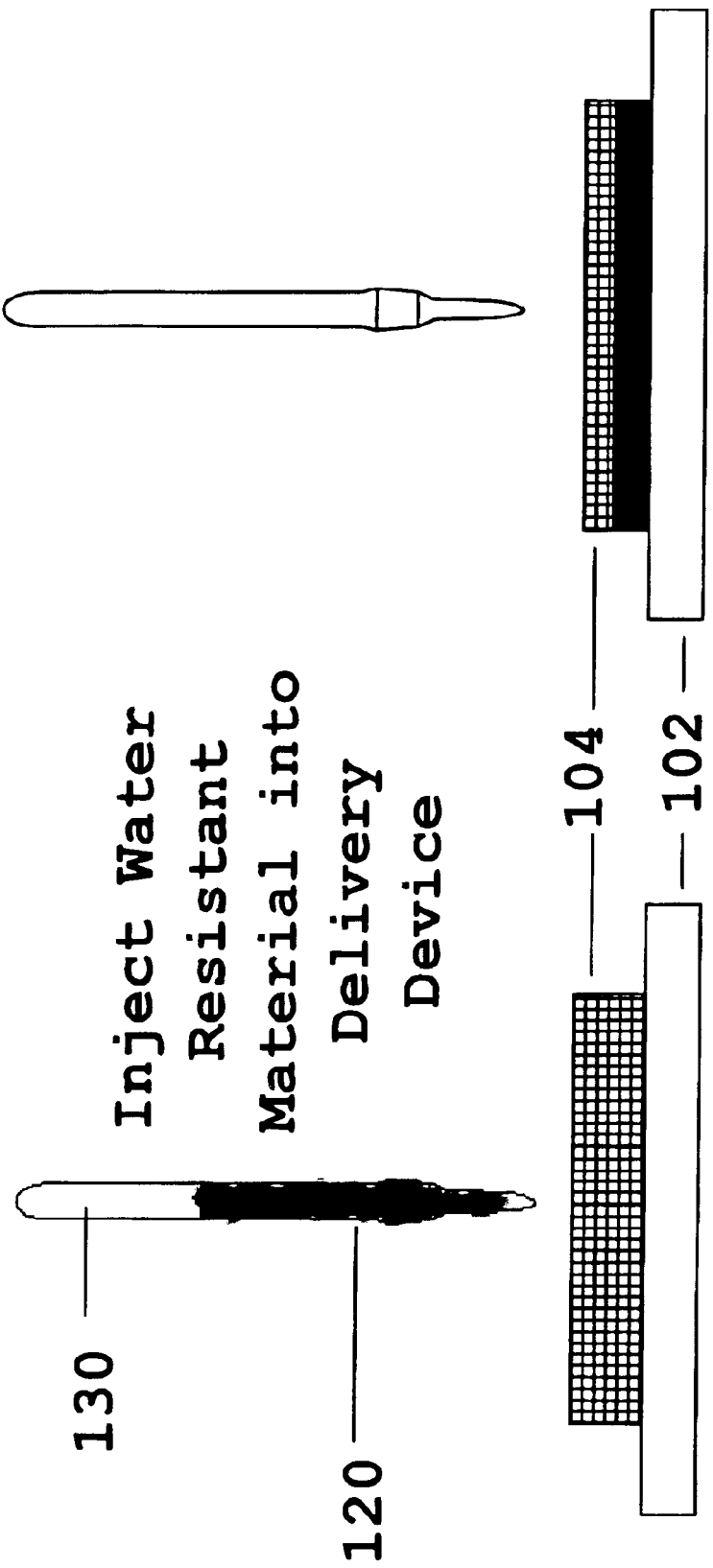

SPLICE PROTECTION SYSTEM

BACKGROUND OF THE INVENTION

1. Field of the Invention

Embodiments of the present invention relate generally to systems for protecting signal transmission devices from adverse conditions that could alter operation of the signal transmission device, such as adverse environmental conditions including dirt, moisture, insects, local chemical and biological contaminants, and microorganisms. More particularly, embodiments of the present invention relate to the protection of a splice or other connection in a signal transmission device, such as an electrical or optical cable. Even more particularly, embodiments of the present invention relate to a novel closure for protecting splice connections from exposure to moisture or other environmental elements that may harm or otherwise interfere with operation of the signal transmission device.

2. Description of Related Art

Changes in plant construction philosophy and methods have often led to the need for new products. The telephone subscriber loop presents one such case. The initial deployment of buried drop wires envisioned a continuous, monolithic run between the terminal and the customer premises. It was expected that, due to the low cost of materials, faulty or faulted runs would be replaced rather than repaired. Today, with the high costs involved with disrupting existing landscaping, the practice of splicing buried drop wire has become common enough to require a special system to protect the integrity of the connection.

The initial distribution plant in coaxial cable used a mechanical connector that was thought to be weather resistant by design. Over the years, these connections have shown themselves to be prone to failure from water intrusion and corrosion. The protection of existing splice connections can require a "split sleeve" system that can be placed mid-span in an existing cable run. The complex geometry of the mechanical connector or connector/tap oftentimes requires the system to be capable of having an encapsulant that will penetrate thoroughly, exclude oxygen to reduce oxidative corrosion, exclude water to prevent signal degradation and electrolysis. A complete potting of the entire connection will help prevent the formation of differential aeration cells. Encapsulants should not exhibit any creep over time since these connections are often made in aluminum conductors and the aluminum can be prone to cold flow. Encapsulant entry could cause an increase in resistance that would lead to cable heating and signal loss at the potentials that are imposed on coaxial cable.

There are several types of systems used for the protection of a buried drop wire splice. The first kind of system uses a two part chemical system that is mixed in the field in a container that may also serve as the final closure. The wires are immersed in the container or the mixture may be poured over the wires in an additional enclosure. There is considerable worker and environmental exposure and hence, resistance to handling small chemical mixes in the field. They can be messy, difficult to handle and apply. There is also the related expense in time lost while waiting for the system to cure. In cold climates the time can be appreciable relative to the entire repair operation.

A second system uses a grease or polymeric filling material confined in a multi-part rigid closure. The joined wires and bonding are inserted in the closure and the parts manually pressed or mechanically forced together to distribute the filling material into all of the void spaces. This approach is vulnerable to the effects of temperature on the flow of filling compound and the volume of wirework placed. Also, quality of work is difficult to monitor since there is no indication of completeness of the interstitial fill. Historically, inadequate filling leaves these systems vulnerable to water ingress from without and via the core of the drop wire. They exhibit severely limited life spans relative to the 40 years expected of most outside plant equipment.

A third system involves a rubber, generally cylindrical, elongated tubular member the inside surface of which is coated with a sealant. The tubular member is secured around the splice with the sealant on the inside surface used to secure the tubular member to the splice and to itself. No filling material is used to encapsulate the splice and prevent the ingress of water from without and via the core of the drop wire.

A fourth system commonly used is a heat-shrinkable sleeve. In addition to requiring special heating tools, there is the potential for deterioration of the integrity of the material due to overheating. Also, the available heat shrinkable materials for such applications are typically of high durometer to withstand the hostile environment, making re-entry as by slitting more difficult and limiting the flexibility of the spliced area. It is for these reasons that heat shrinkable materials have found little acceptance in the coaxial plant as well.

The nature of the mechanical connectors used in coaxial plant may necessitate periodic adjustment of the connector. Hence, any protective device must be easily removed and replaced. An advantage is gained if the same device can be reused as in the case where the encapsulant gel would return into the storage media leaving the connector clear and clean.

In the case of optical fibers, the present systems use large closures to house splices and provide mechanical strain relief and fiber alignment against micro bending losses. The use of mechanical connectors for fiber connections will increase as wider use of fiber is made in distribution plant and single fibers, rather than bundles or cables, are brought to the end use point. These connections will require protection from many environments from the weather to industrial environments on the factory floor to ordinary housekeeping activities in offices. The constant rearrangement of devices will require a protective device that is easily removed and that removes cleanly.

SUMMARY OF THE INVENTION

Splice protection systems of the present invention are useful for preventing unwanted entry of external elements into the splice regions of signal transmission devices, thus preserving the integrity and function of the signal transmission devices. In addition, embodiments of the present invention relate to closures for protecting signal transmission devices from adverse environmental conditions such as dirt, moisture, chemical contaminants and microorganisms that may adversely affect the operation of the signal transmission device. The adverse effects of dirt and moisture are of concern especially when the signal transmission devices are buried underground or placed in contaminated micro environments such as machine tool housings.

The protective sheathing or other coating (collectively "coating") of signal transmission devices, such as electrical or optical cables, are oftentimes opened to fix the conductors, i.e. wires or optical fibers, therein or otherwise splice additional signal transmission devices together. Once the integrity of the protective coating is breached, dirt and moisture will penetrate the signal transmission device oftentimes causing failure unless steps are taken to seal out dirt and moisture and restore the original integrity of the cable.

In its simplest embodiment, the closures of the present invention include a wrapper, such as a flexible sheet of plastic, in combination with a water resistant material deposited onto or otherwise connected, affixed or adhered to the preferably flexible wrapper. The flexible wrapper with the water resistant material is then wrapped around the desired portion of the signal transmission device, such as a splice, and the water resistant material is manually massaged into the splice connection. The massaging of the material may be accomplished using numerous methods, such as, for example, manually massaging the material or massaging the material using mechanical tools, such as pliers, compression rings, and the like. The water resistant material is typically disposed on the wrapper and acts to invasively fill any spaces or voids after the closure is wrapped around the signal transmission device. That is, after wrapping the closure around a splice portion of a signal transmission device, which connects two or more signal transmission wires or cables, the closure is compressed to force the water resistant material into the spaces surrounding the connection portion. The closure may comprise innumerable geometric shapes and dimensions, and the shape is preferably chosen such that the closure can envelope the splice area to encapsulate the splice region. One skilled in the art, given the benefit of this disclosure, will be able to select shapes and geometries suitable for use in wrapping splices of signal transmission devices.

According to one embodiment of the present invention, the water resistant material is retained within a flexible delivery device attached to the wrapper or backing sheet and from which water resistant material is forced. The delivery device acts to hold the water resistant material prior to wrapping and compression of the closure around the splice. The flexible wrapper is of sufficient dimensions to encircle or otherwise enclose the splice and, in certain embodiments, is impermeable to the migration of the encapsulant and/or is water resistant, water impermeable or water impenetrable. In certain embodiments, the delivery device is a porous material that retains the water resistant material or is one or more breakable packages, bags or beads or other container containing the water resistant material. The delivery device can be secured to the flexible wrapper using adhesives, epoxies, removable fasteners such as double-sided tape, Velcro®, and the like. Also, the delivery device can be adhered to the flexible wrapper by the water resistant material itself that is contained within the delivery device. According to one embodiment, the water resistant material is self-healing, and the self-healing property of the material allows for the formation of a single mass of water resistant material with no paths for the ingress of water or other chemical or biological contaminants. That is, the water resistant material is chosen such that compression of the water resistant material results in occupancy of any and/or all spaces or cavities contained within the closure.

According to the present invention, the splice is surrounded by the closure and then the water resistant material is forced into and around the desired portion of the signal transmission device (such as a splice), according to one embodiment, by applying pressure to the closure and, if present, the delivery device, such as manual pressure or radial force applied by an over-wrapping, elastomeric media. The water resistant material encapsulates or otherwise surrounds the splice thereby restricting penetration of dirt and moisture into the splice and at a location where dirt and moisture can adversely affect the operation of the conductors in the signal transmission device. The user can determine the nature and extent of manual pressure, such as by squeezing by hand, needed to effectuate the desired amount of water resistant material required to surround the splice for adequate protection. The closure can be securely attached to the splice and also covered with a suitable water or other environmentally or mechanically resistant covering.

In accordance with preferred embodiments, the backing sheet or wrapper comprises a sheet of plastic, rubber, paper, metal, or other flexible material. Preferably, any material that is capable of being wrapped around a cylindrically shaped object, such as a electrical cables, coaxial cables, fiber optic cables, category 5 cables and the like, may be used in the backing sheet. Preferably the backing sheet or wrapper is a flexible, water impenetrable material such as polyethylene, polypropylene, rubber and the like. In certain embodiments, the water resistant material is retained within a flexible delivery device from which water resistant material is forced using compression. In preferred embodiments, the water resistant material is typically any suitable commercially available gel, grease or encapsulant that is used in the telecommunications industry as a water resistant material. Examples of such materials include commercially available lubricants and greases, such as those available from Nye Lubricants (New Bedford, Mass.). The water resistant material need not be formulated prior to application to the splice, such as is the case of commercially available two part mixtures. The water resistant material typically is ready for use as deposited on or otherwise connected to the flexible wrapper or as contained within the delivery device. The water resistant material may exit the delivery device by the application of pressure, heat, or other mechanical forces capable of forcing the water resistant material out of the delivery device.

In accordance with preferred embodiments, the delivery device typically comprises a porous structure suitable for retaining the water resistant material. Such porous structures typically have sponge-like properties yet have the ability to release the water resistant material if compressed. The delivery device may comprise numerous pores having similar or different sizes, geometries, and shapes. That is, the number, size, and geometries of the pores may vary depending on the intended use of the delivery device and on the properties and characteristics of the water resistant material to be disposed on or in the delivery device. Preferably, the delivery device comprises at least about 2 pores per square inch. More preferably the delivery device comprises about 4 to 50 pores per square inch. In certain embodiments, the pores preferably have a diameter of less than about 1 inch, more preferably less than about 0.5 inches, and most preferably less than about 0.1 inches, for example 0.01 inches or less. One skilled in the art, given the benefit of the disclosure, will be able to select suitable pore diameters and sizes depending on the properties and characteristics of the water resistant material.

In accordance with another aspect, a kit is provided that includes a closure, a water impervious covering and binders for securing the water impervious covering over the closure. The water impervious covering can be any commercially available rubber sleeve or wrapper and the binders can be commercially available tape such as butyl tape. Additional elements of the kit can include additional tapes, such as vinyl tape, clamps, cable ties and rigid enclosures into which the closure is placed. According to the present invention, the rigid enclosure can be fashioned from plastic, metal or other rigid material and encloses the splice protection system of the present invention.

In accordance with a method aspect, the closure is used to protect a signal transmission device from dirt and moisture by application of the closure to the splice area of the signal transmission device. The method typically comprises contacting and wrapping the splice with the closure and compressing the closure to force the water resistant material into voids in the splice. In certain embodiments, a user positions a splice on the delivery device and then positions the wrapper around the splice. The user then applies manual pressure to force the water resistant material from the delivery device as the wrapper is folded around the splice. The user then secures the closure around the splice using tape while continually applying pressure to the closure, for example manually massaging the closure, in a manner to provide for maximum distribution of the water resistant material around and into the splice. The water resistant material advantageously maintains its properties regardless of the ambient temperature. Tactile feedback to the user aids in determining the completeness of the fill of the water resistant material around the splice. The closure may then be secured to the signal transmission device using any of the methods and apparatus described here or other suitable methods known to those skilled in the art.

Unlike prior, conventional two part systems that require the user to mix separate solutions to create the gel used to encapsulate the splice, the closure of the present invention is particularly advantageous because premixing of the water resistant material is not required by the user. The present invention avoids the difficulties of having to mix chemical ingredients in the field and also eliminates the use of a separate container that surrounds the splice and into which the mixed chemical system is poured. Also, certain embodiments of the present invention prevent any unnecessary hand or component contact with the water resistant material during application.

Accordingly, it is an object of the present invention to provide a simple and easy to use system for the protection of a signal transmission device from adverse environmental conditions such as dirt and moisture. It is another object of the present invention to provide a closure for a splice of a signal transmission device to protect the splice from adverse environmental conditions such as dirt and moisture. It is yet another object of the present invention to provide a system for the protection of a splice that is directly buried underground or is in an underground plant. It is still yet another object of the present invention to provide a system for the protection of a splice that uses a water resistant material that need not be premixed prior to application to the splice. It is a further object of the invention to provide a system for the protection of a splice that allows for easy determination of completeness of fill prior to burial.

These and other objects, features and advantages of the present invention will become apparent from the following description taken in conjunction with the accompanying drawings.

BRIEF DESCRIPTION OF THE DRAWINGS

Certain preferred embodiments of the invention will be described below with reference to the attached drawings in which:

FIGS. 3a and 3b are cut-away side views of a closure in accordance with a first embodiment.

FIG. 4 is a top view showing adhesive disposed on a surface of a closure in accordance with preferred embodiments.

FIGS. 7a–7c are cut-away side views of a container suitable for holding a water resistant material and a backing sheet suitable for receiving a water resistant material in accordance with preferred embodiments.

FIGS. 9a and 9b are side views of a closure comprising a delivery device in accordance with preferred embodiments.

It will be apparent that the closures, signal transmission devices, and the elements of the closures and signal transmission devices, shown in FIGS. 1–9 are not necessarily to scale. Certain dimensions, such as the thickness of the water resistant material, may have been enlarged relative to other dimensions, such as the thickness of the protective covering or backing sheet, for clarity of illustration and ease of understanding.

DETAILED DESCRIPTION OF CERTAIN PREFERRED EMBODIMENTS

It will be recognized from the above, that the closure disclosed herein can be assembled and formed using innumerable materials, shapes, and sizes. The precise sizes and configurations, including the choice of materials and properties of the wrapper, water resistant material, protective covering, rigid closure and delivery devices will depend in large part on the particular application for which the closure is intended. For convenience in this more detailed description of certain preferred embodiments, the closure will generally be of a type suitable for use in wrapping splices of signal transmission devices, such as the splice region of two or more drop wires. However, it will be understood by those skilled in the art that the closures can be used with coaxial cable splices, mechanical connections between signal transmission devices, soldered, twisted or metallurgical joints or connections, fiber optic splices, devices used to make optical connections or any other application where it is desirable to protect a device from adverse conditions. It will be within the ability of those skilled in the art, however, given the benefit of this disclosure, to select suitable materials and designs, as well as manufacturing techniques, for production and use of closures in accordance with the principles of the present invention, suitable for these and other types of applications.

Figure 1:
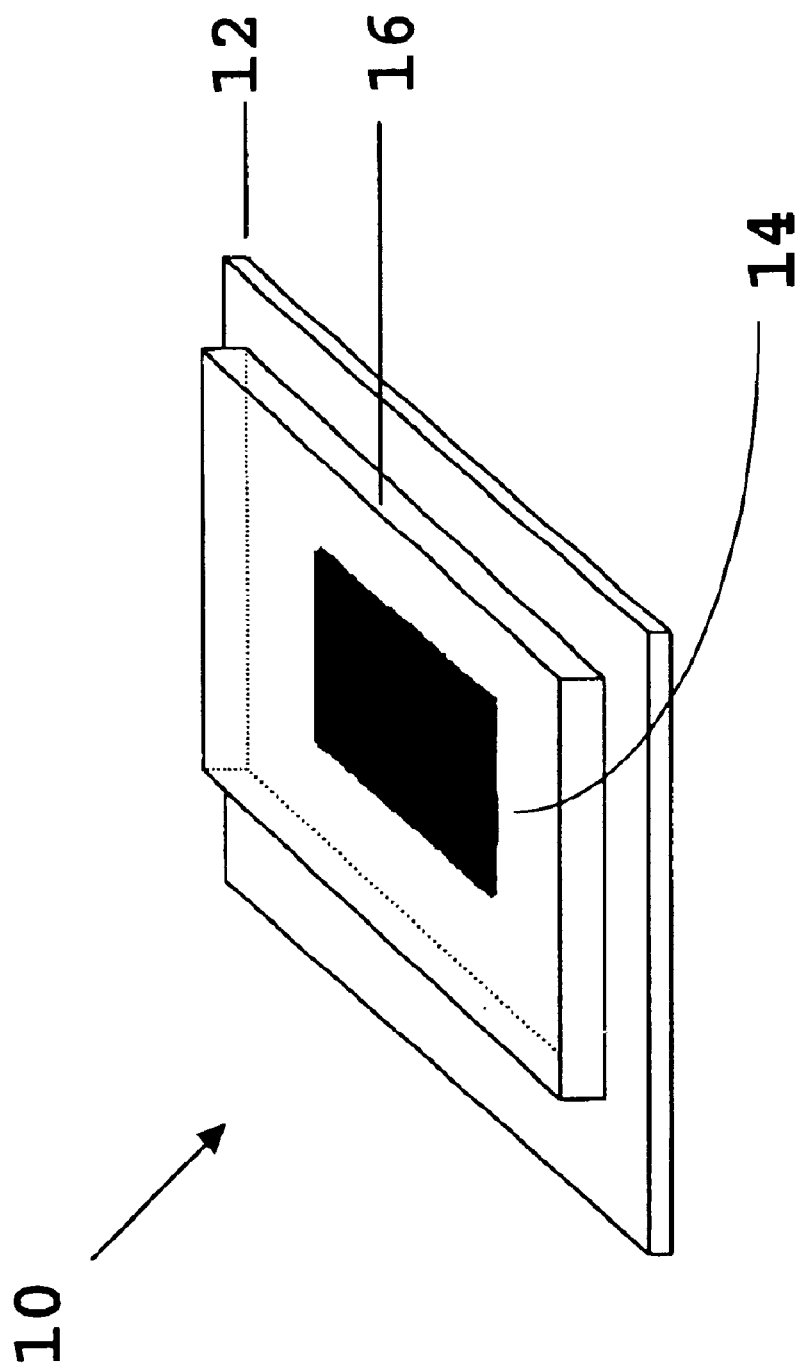
FIG. 1 is a side perspective view of a closure in accordance with a first embodiment.
Figure 2:
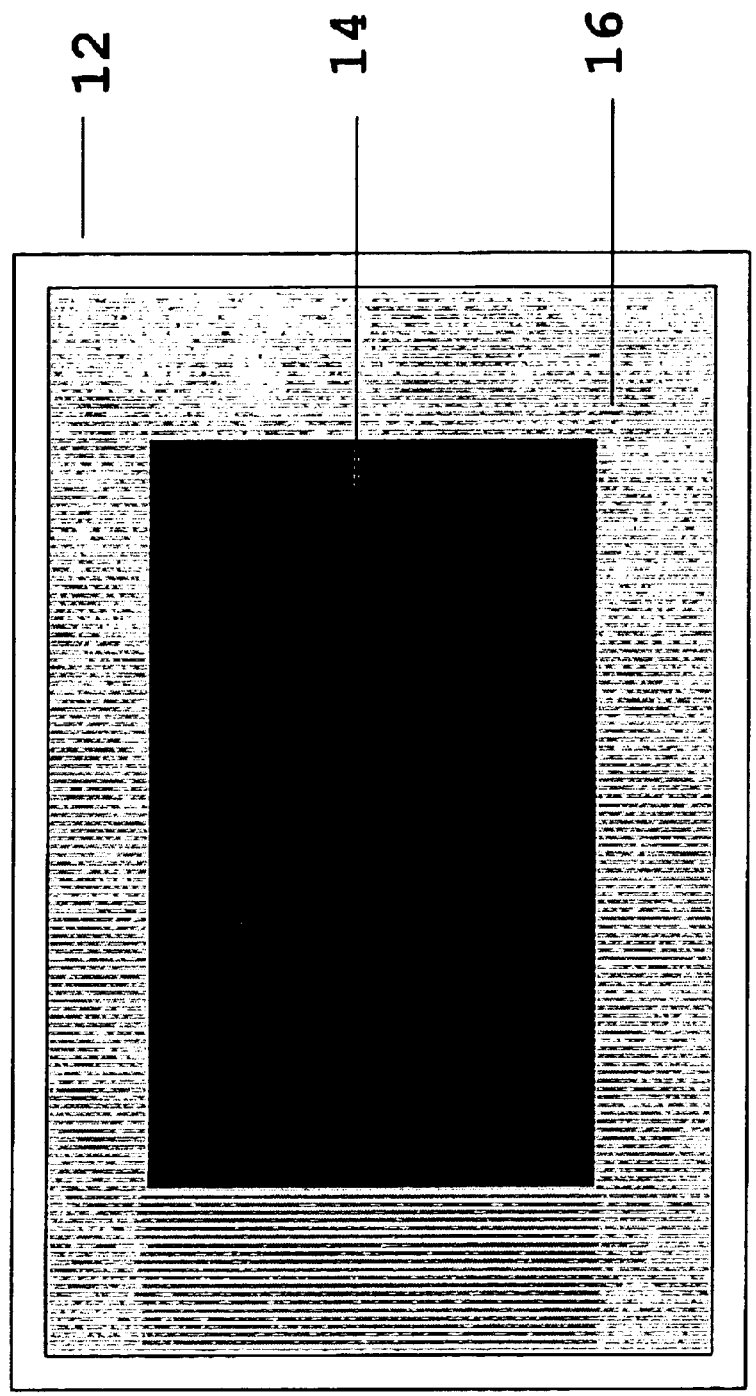
FIG. 2 is a top view of a closure in accordance with a first embodiment.
Figure 5B:
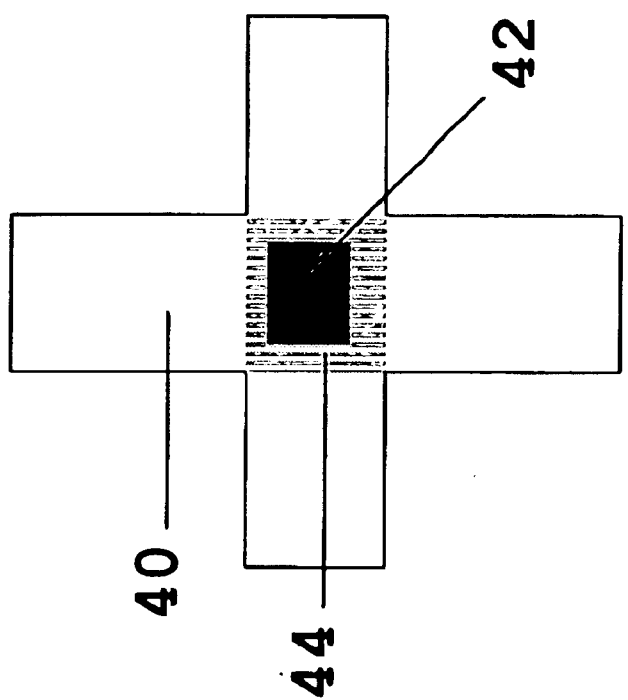
FIGS. 5a and 5b are top views of several of many possible embodiments of a closure in accordance with preferred embodiments.
Figure 5A:
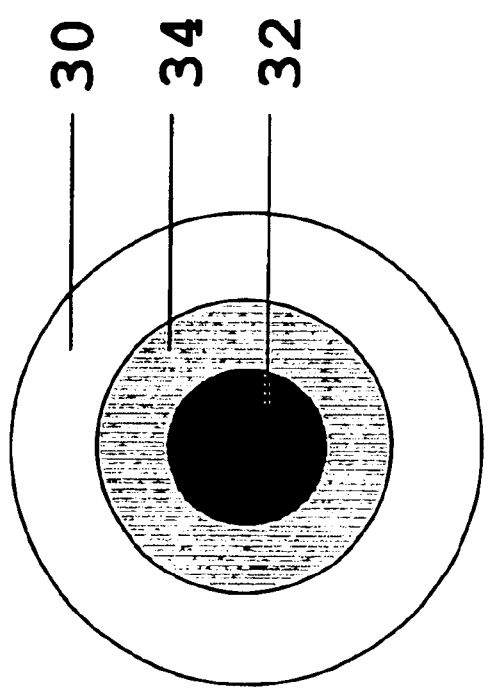
Figure 6:
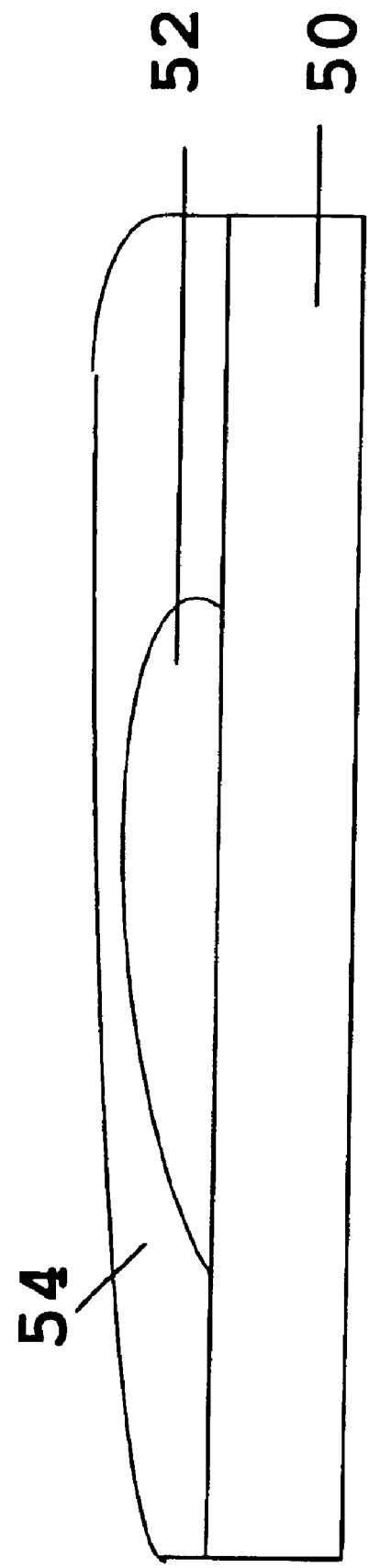
FIG. 6 is a cut-away side view of a closure in accordance with a second embodiment.

In accordance with preferred embodiments, a closure 10 includes a wrapper or backing sheet 12, a water resistant material 14 disposed or otherwise deposited on the wrapper 12, and an optional protective covering 16 removably disposed on the backing sheet and covering the water resistant material 14 (see FIG. 1). The backing sheet 12 typically is formed from a plastic or other polymeric based material suitable for supporting the water resistant material 14. In certain embodiments, the backing sheet comprises polyethylene, polypropylene, rubber and the like. The backing sheet preferably is substantially flexible to allow for wrapping of the closure around a cylindrical, rectangular, circular, or other geometric shape device, such as a splice resulting from the joining of two or more coaxial cables, a splice resulting from joining of two or more phone or communication wires, such as fiber optic cabling, category 5 cabling and the like, etc. In certain embodiments, the backing sheet is formed from a clear material, such as a clear, flexible plastic, that allows for visualization of the splice during the wrapping process (described below). In other embodiments, the backing sheet is colored or is opaque. In preferred embodiments the backing sheet comprises a water impermeable or impenetrable material that will provide added protection to the splice after wrapping of the splice with the closure. Suitable water impermeable plastics include polyethylene, polypropylene, and the like. One skilled in the art, given the benefit of this disclosure, will be able to select other suitable clear or colorless and flexible or rigid plastics and polymers suitable for an intended use of the closure. Examples of suitable water-resistant materials include greases and lubricants with similar properties to National Lubricating Grease Institute Greases in the 0–3 range. Preferably, the water resistant material is non-flowable and is sufficiently tacky so as to adhere to itself and the flexible backing sheet and the splice components. In accordance with preferred embodiments, certain useful water resistant materials, such as petroleum, silicone or synthetic greases will exhibit electrical properties that will not significantly alter or interfere with any signals to be transmitted using the signal transmission device. Useful water resistant materials such as petroleum, silicone or synthetic greases will also not be corrosive to or incompatible with the materials of construction in the signal transmission device and will operate in the temperature range of interest. In certain embodiments, these greases are hydrophobic and water resistant and also optionally contain elements or ingredients that passivate or absorb water that may contact the greases. Marine grade greases are also useful greases and can be stabilized for long-term exposure with antioxidant and anti-fungal additives. Several electrical grade greases or gels are commercially available as sealers and insulating materials. One example of a commercially available water resistant material is Dow Corning 5 Compound. One skilled in the art, given the benefit of this disclosure, will be able to select other suitable water resistant materials.

In accordance with preferred embodiments, the protective covering 16 is removably disposed on the water resistant material and is designed to prevent the water resistant material from directly contacting other physical devices and is also designed to protect the water resistant material from environmental elements. The protective covering 16 typically is disposed in a manner to cover the entire surface of the water resistant material 14 and removably contacts the backing sheet 12 (see FIG. 2). That is, the protective covering typically has slightly larger dimensions, e.g. height, width, and/or thickness, than the planar dimensions of the water resistant material, and the protective covering may be attached to the surface of the backing sheet such that the water resistant material is disposed between the protective covering and the backing sheet. For example, in embodiments where the water resistant material is disposed in a generally planar manner on a planar backing sheet (see FIGS. 1–3), a planar protective covering, having dimensions larger than the dimensions of the water resistant material, typically overlies the water resistant material (see Inset of FIG. 3a). In certain embodiments, the protective covering is made of a flexible plastic, or other polymeric composition, which typically is clear, colorless, or colored. In other embodiments, the protective covering comprises more rigid and less flexible plastics or other polymeric compositions.

In accordance with preferred embodiments, the protective covering typically is removed prior to use of the closure (see FIG. 3b). Because the protective covering is removably disposed on the water resistant material, the protective covering may be peeled away to expose the water resistant material preferably without any of the water resistant material attaching to the peeled away protective covering (see FIG. 3b). Non-stick coatings, such as Teflon®, may be deposited onto the surfaces of the protective covering to prevent any of the water resistant material from sticking to the protective covering. Therefore, a maximum amount of water resistant material remains disposed on the backing sheet for use in enclosing a splice.

In accordance with preferred embodiments, the protective covering is typically removed by peeling of the protective covering from the backing sheet. Attachment of the periphery of the protective covering to the surface of the backing sheet using an adhesive, epoxy, double-sided tape, etc., is preferred to facilitate removal of the protective covering. Therefore, the protective covering may be removed and subsequently reattached (if necessary) using the same adhesive on the backing sheet (see FIG. 4). The adhesive is not required to be continuous on the backing sheet but instead may be deposited intermittently to facilitate attachment of the protective covering to the backing sheet. For example, FIG. 4 shows adhesive strips 24 disposed on a backing sheet 20 that comprises a water resistant material 22. One skilled in the art, given the benefit of this disclosure, will recognize that an adhesive, adhesive strips, double-sided tape and the like need not be attached only to the backing sheet. For example, an adhesive strip can be attached along the periphery of the protective covering instead to facilitate attachment of the protective covering to the backing sheet. Adhesive may also be attached to both the protective covering strip and the backing sheet. Additionally, other removable fasteners, such as Velcro® and the like, may be used to removably attach the protective covering to the backing sheet. Such removable fasteners provide for reuse of the protective coverings. After removal of the protective covering, the closure may then be used to wrapper a splice for protection of the splice from environmental and biological elements. In other embodiments, after the closure is wrapped around the splice area, the protective coating is wrapped around the closure and attached using the adhesive fixed to the protective coating. That is, the protective coating may be wrapped over and around the closure to provide an additional barrier to prevent penetration of water or chemical or biological contaminants.

In accordance with preferred embodiments, the shape of the closure is not limited to planar or rectangular shapes. That is, the closure may comprise other suitable dimensions and shapes, such as a circular backing sheet 30 and a circular protective covering 34 overlying the water resistant material 32 (see FIG. 5a). In other embodiments, the closure comprises a cross-shaped backing sheet 40 and a rectangular protective covering 44 overlying the water resistant material 42. (see FIG. 5b). According to the cross-shaped embodiment shown in FIG. 5b, the backing sheet or wrapper 40 has first, second, third, and fourth flaps for wrapping around a wire or cable splice. Furthermore, certain embodiments of the wrapper may be cut or trimmed to a shape suitable for an intended use. One skilled in the art, given the benefit of this disclosure will be able to select other suitable shapes and dimensions for an intended use.

In accordance with preferred embodiments, the water resistant material is not required to be deposited or disposed onto the backing sheet in a planar manner. In certain embodiments, the water resistant material comprises a generally non-planar irregular shape 52 disposed on a planar backing sheet 50 (see FIG. 6). An optional protective covering 54 of suitable shape covers the water resistant material 52. Because protection of the splice requires substantially covering the splice with the water resistant material, numerous shapes and geometries may be designed depending on the shape of the splice (or splice area) to be covered.

In accordance with certain embodiments and with reference to FIGS. 7a–7c, the water resistant material 70 may be initially located within a protective container 75, or other containing device, removably attached to the backing sheet 90, which can then be removed leaving the water resistant material adhered to the backing sheet. The protective container 70 may be removed with the water resistant material remaining adhered to the backing sheet 90. Preferably, the container is coated with a non-stick material, such as Teflon® and the like, such that when the container is removed, the maximum amount of water resistant material is retained on the backing sheet (see FIG. 7c). The container may comprise any suitable device for holding the water material, such as a plastic cup and the like.

Figure 8A:
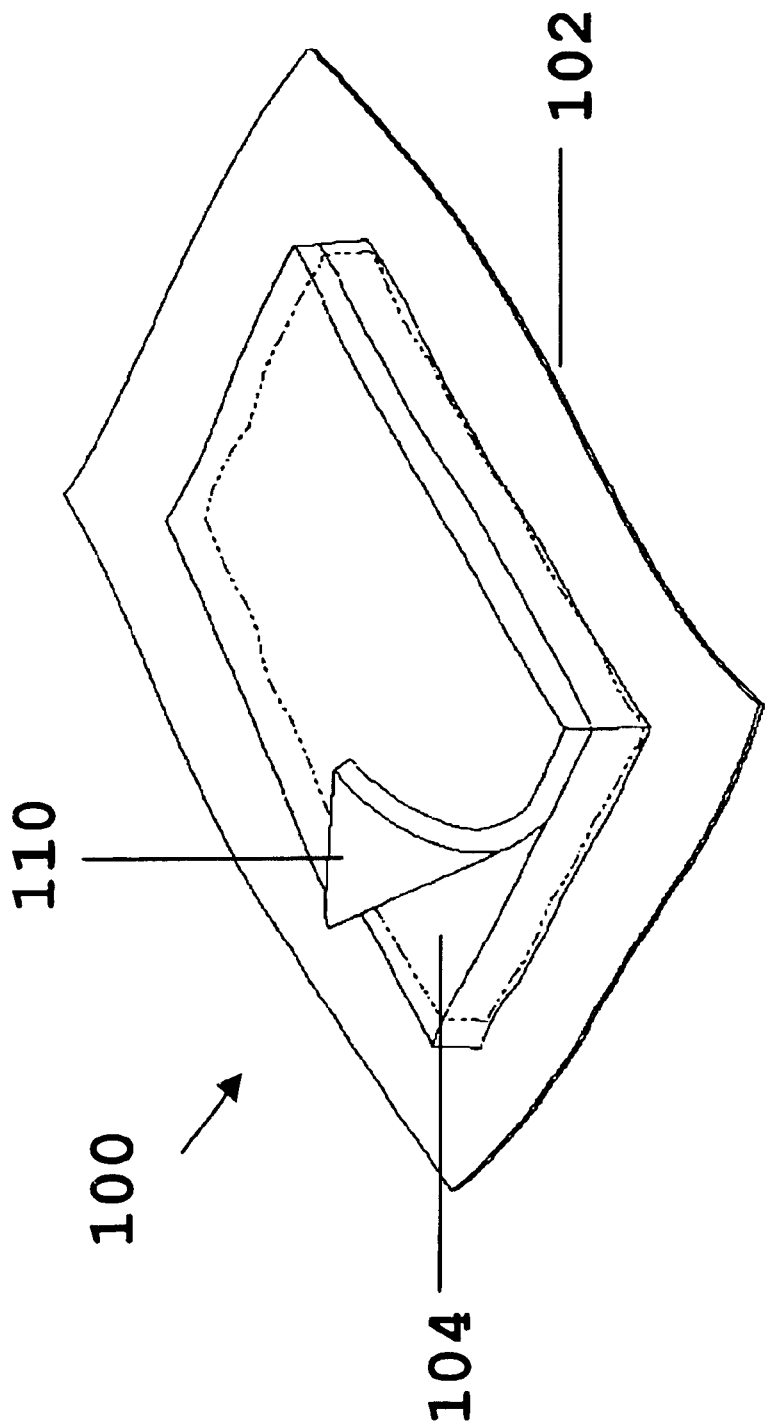
FIGS. 8a–8b are embodiments of the closure comprising a delivery device.
Figure 8B:
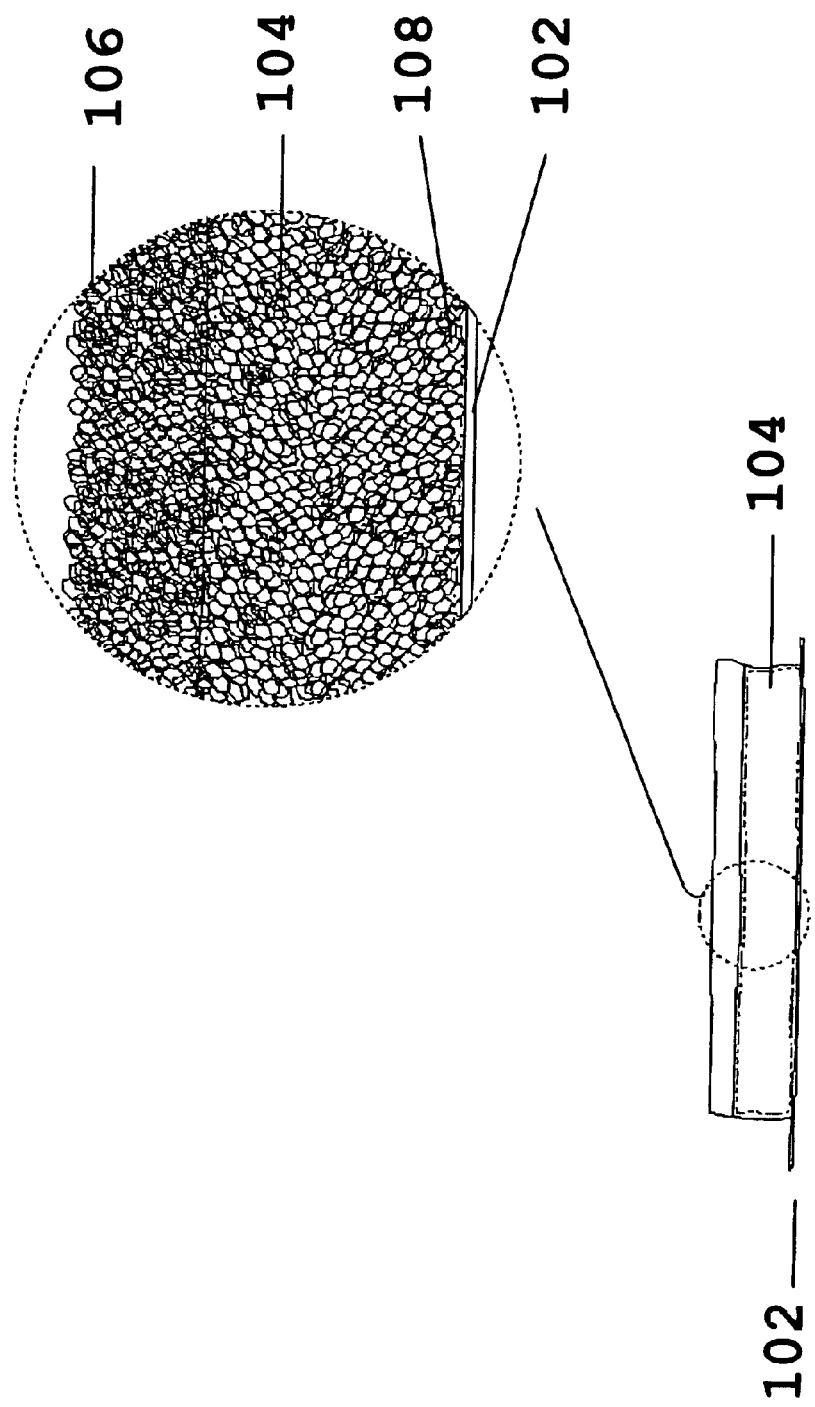

In accordance with preferred embodiments, FIG. 8a is a side view of a closure according to a second embodiment. The closure 100 comprises a wrapper or backing sheet 102, a delivery device 104 suitable for holding a water resistant material, and a protective coating 110. As shown in FIG. 8b, delivery device 104 is depicted as a porous media with a top surface 106 and a bottom surface 108 (See Inset of FIG. 8b). Preferably, the porous media is open-celled, although closed-celled media such as sponges may have certain desirable applications. The bottom surface 108 is typically positioned adjacent to a surface of the wrapper 102. According to one embodiment, the bottom surface 108 of the delivery device 104 contacts the top surface of the wrapper 102. A water resistant material 120 is loaded into the delivery device which is adjacent the wrapper 102 by simply pouring the water resistant material onto the delivery device or by other means such as a pump, syringe or other suitable device 130 that is capable of forcing, or injecting as the case may be, the water resistant material into the pores of the delivery device 104 such that the water resistant material 120 is retained in the delivery device 104 (see FIGS. 9a and 9b). Alternatively, the delivery device may simply be allowed to contact the water resistant material and absorb the water resistant material into the delivery device. According to one embodiment, the water resistant material 120 has a tacky consistency so as to removably adhere to the wrapper 102 to secure the delivery device 104 to the wrapper 102.

In accordance with preferred embodiments, the porous media of the delivery device is compressible so that the water resistant material may be forced from the delivery device upon application of external pressure. Open-celled porous media is commercially available from TMP Technologies, Buffalo, N.Y., in the form of a reticulated foam sheet (RFS) having various sizes, thicknesses and porosities. As shown in FIGS. 8b and 9a, the delivery device typically has a rectangular-like shape, although one skilled in the art, given the benefit of this disclosure, will recognize that the delivery device can take any shape suitable for use in retaining and delivering the water resistant material. In certain embodiments, the porosity of the reticulated foam sheet is at least about 2 pores per square inch, more preferably about 4 pores per square inch, for example, between about 4 to about 25 pores per square inch. One skilled in the art, given the benefit of this disclosure, will recognize the delivery device can have any porosity suitable for use to retain and deliver water resistant materials. The delivery device 104 should be of sufficient length, width and thickness to retain enough water resistant material 120 to fully surround or otherwise encapsulate the desired splice. Preferably, the delivery device comprises one or more layers of porous materials, such as the porous media described above. More preferably the delivery device comprises two or more layers of porous materials.

In accordance with preferred embodiments, the water resistant material can occupy the delivery device prior to use. In certain embodiments, the water resistant material has a viscosity sufficient to resist significant flowing of the water resistant material from its position on the wrapper. As discussed above, prior to use of the closure and during shipment or storage, the closure can have a suitable container or covering disposed on the water resistant material and removably attached to the backing sheet. The container can be removed leaving the water resistant material connected to the wrapper. In certain embodiments, during shipment or storage, the water resistant material can be contained within the closure by a flexible sheet that adheres to the wrapper thereby containing the water resistant material therebetween. The flexible sheet is removed from the wrapper to reveal the water resistant material adhered, affixed or otherwise attached to the wrapper for application to the signal transmission device. Preferably, the flexible sheet can be peeled away from the wrapper to reveal the water resistant material prior to usage. In addition to flexible sheets, other containers can also be used (with or without a delivery device contained in the container) such as cups or other receptacles which can constrain or contain a given amount of water resistant material and which would be removably adhered to the flexible wrapper. The container is removed leaving the water resistant material adhered or otherwise disposed on the wrapper.

In accordance with preferred embodiments, the wrapper is preferably flexible and rectangular so that the wrapper can be configured to the normally substantially cylindrical design of a signal transmission device or splice connection. In certain embodiments, the wrapper is a sheet of paper and more particularly, paper coated with plastic or other suitable material so as to prevent the water resistant material from seeping or leaking out of the delivery device. The wrapper is preferably impermeable to the migration of the water resistant material and maintains flexibility at the operating temperature range and further meets the signal carrying standards for the operating cable. For example, a foil lined paper wrapper, which may be a useful wrapper in certain applications, may be less advantageous in certain electrical systems. Similarly, paper wrappers may be advantageous for uses at low temperatures, and plastic wrappers may be advantageous at higher temperatures. One skilled in the art, given the benefit of this disclosure, will be able to select materials for the wrapper suitable for an intended use.

In accordance with preferred embodiments, the wrapper also serves to facilitate retention of the water resistant material within the delivery device. In certain embodiments, the wrapper can be made of material that is water resistant or water impenetrable to prevent the ingress of moisture into the closure. In other embodiments, the wrapper is made of a suitable material that is resistant to water and any components contained therein, such as ionic species contained in seawater. In additional embodiments, the wrapper is made of a suitable material that is resistant to entry of gaseous species. Such materials prevent oxidation (or other chemical reactions) of any conducting materials, such as copper, semi-conducting materials and the like, contained inside the signal transmission device. While the wrapper can be made out of plastic or rubber, paper can be advantageous because it is inexpensive and typically inelastic. In other embodiments, the wrapper comprises paper with a plastic coating on one surface of the paper. Depending on the intended use of the wrapper, the water resistant material may be in contact with either the paper surface or the plastic surface. One skilled in the art, given the benefit of this disclosure, will be able to identify and select other suitable materials useful as wrappers. The wrapper should preferably be of sufficient size to support the water resistant material and, if present, the delivery device, and have enough water resistant material for wrapping around the signal transmission device at the desired location, e.g. the splice.

In accordance with preferred embodiments and as discussed above, the wrapper may comprise an adhesive material at its perimeter or edge which allows the wrapper to be self sealing when surrounding the signal transmission device at the desired location. That is, in embodiments where the wrapper comprises a self-sealing material, an external covering or device is not required to attach the wrapper to the splice area. In certain embodiments, the adhesive material may be coated along the entire surface of the wrapper or may be coated intermittently along the surface of the wrapper. Suitable adhesives are commercially available in the form of adhesive strips that can be attached to the edges of the wrapper either in the field at the time of use or at the time of manufacture. The adhesive material can then be exposed prior to application to a signal transmission device. Other suitable adhesives and water resistant adhesives, such as polyvinyl alcohol adhesives, for example, the Elvanol® family of adhesives manufactured by Dupont, may be applied to the wrapper prior to wrapping the splice. In certain embodiments, such adhesives can have a dual use. That is, the adhesive may initially function to maintain the protective covering over the water resistant material and delivery device. After removal of the protective covering, the exposed adhesive may then be used to seal the wrapper around the splice and signal transmission device. One skilled in the art, given the benefit of this disclosure, will be able to select suitable adhesives and suitable devices for applying the adhesives, such as syringes, brushes, and the like, to the wrappers.

In accordance with preferred embodiments, the delivery device can be loaded with water resistant material in a manner to avoid the presence of the water resistant material at the top surface of the delivery device, i.e. the top surface of the delivery device is substantially free of the water resistant material. For example, in certain embodiments, the water resistant material fills only up to about 80% of the thickness of the delivery device, preferably only up to about 70% of the thickness of the delivery device and more preferably only up to about 50% of the thickness of the delivery device. Because the top surface of the delivery device is free of the water resistant material, the splice may be positioned on the top surface and further adjusted without contacting or disturbing the water resistant material and otherwise tracking the water resistant material away from the delivery device. That is, in embodiments, where the delivery device is not completely filled with water resistant material, the splice may be positioned above the wrapper without contacting any of the water resistant material (prior to compression of the closure). Alternatively, the delivery device can be filled up to 100% of its thickness and a protective covering made of paper, plastic or other suitable material may be used to cover the top surface of the delivery device to retain the water resistant material. The covering typically is removed prior to use of the closure. In other embodiments, the device is filled up to about 80% and a protective covering is used to prevent any loss of the water resistant material. In preferred embodiments, the porosity of the open-celled, porous media is sufficient to allow the flow of water resistant material around the splice when the closure is compressed.

In accordance with preferred embodiments, alternative delivery devices include, but are not limited to breakable bags, breakable bladders, breakable (imbiber) beads, or other breakable containers containing the water resistant material and other breakable media for releasing the water resistant material. In certain embodiments, the protective covering is breakable such that application of pressure to the protective covering allows the water resistant material to squeeze through and surround the splice. That is, the closure may be wrapped around the splice without removal of the protective coating and subsequent application of external pressure to the wrapped closure induces breakage of the protective covering and sealing of the splice using the water resistant material.

In accordance with preferred embodiments, the water resistant material is loaded into the open celled porous media delivery device by a suitable pumping device such as any syringe or caulking device known in the art. According to one embodiment, the tip of a caulking device is pressed against the open celled porous media and the water resistant material is forced into the open celled porous media in a desired amount. In certain embodiments, the water resistant material is a self-healing conformable gel adhesive/encapsulant (CGAE) which is unaffected by changes in temperature. An example of such a gel has a cone penetration value from about 100 to 350 ($10^{-1}$ mm) and an ultimate elongation of at least about 200%. One skilled in the art, given the benefit of this disclosure, will be able to select suitable gel adhesive/encapsulants for use in the closures disclosed here.

In accordance with preferred embodiments, the open-celled porous media, having dimensions of about 5"×5"×¾", can be impregnated with the water resistant material by placing the porous media into a solution of the water resistant material. The water resistant material may be a conformable gel that is preferably self-healing and is retained in the porous media filling ½" of the ¾" depth of the porous media. Once the porous media has been impregnated with the water resistant material, the porous media can be attached to the backing sheet, comprising a coated paper sheet having dimensions of about 10"×14", with the unfilled portion of the porous media facing away from the backing sheet and providing a dry work surface. That is, the top of the delivery device preferably does not have any water resistant material disposed on its surface. The attaching of the porous media to the backing sheet may be accomplished using any number of suitable adhesives, epoxies, tapes, and the like known to those skilled in the art. The water resistant material itself may be tacky enough to provide adherence. Alternatively, the surface of the backing sheet may be made rough or abrasive or comprise a suitable surface for facilitating adherence of the water resistant material. A protective covering having dimensions of about 8"×12" may be disposed on the delivery device and attached to the backing sheet.

In accordance with certain embodiments, a splice of a signal transmission device is placed on the top surface of a delivery device of a closure of the present invention. In practice the spliced wirework including bonding connectors are placed on the surface of the partially filled, porous media. This surface typically is dry and allows the constituent components of the splice to be arranged in any manner desired without either hand or component contact with the viscous material, e.g. the water resistant material, contained in the delivery device. The wrapper is rolled or wrapped around the assembly to bring the compressible, open cell, porous media into 360° contact with the splice components. The rolling/wrapping operation is continued until the porous media is sufficiently compressed to have exuded the water resistant material into all the voids in the splice. Typically, tactile confirmation of the completeness of the fill is used to determine the end of the operation. Taping the completed assembly with one or more elastomeric tapes provides a continuous radial force. Optionally, the taped unit is then placed in a secondary rigid container. In alternative embodiments, the completed assembly is wrapped with an additional enclosure, such as a rubber sleeve. The additional enclosure may be fastened with tape or may be fastened with an adhesive prior to burying the assembly. It should be noted that the protection of drop wire splices is but one example of a possible use for this system. The system may have further use in any application that requires environmental protection.

Although the present invention has been described above in terms of specific embodiments, it is anticipated that other uses, alterations and modifications thereof will become apparent to those skilled in the art given the benefit of this disclosure. It is intended that the following claims be read as covering such alterations and modifications as fall within the true spirit and scope of the invention.

What is claimed is:

1. A method of protecting a splice of a signal transmission device comprising:

providing a closure comprising a flexible wrapper and a water resistant material;

arranging the splice in contact with the water resistant material;

wrapping the flexible wrapper around the splice to bring the water resistant material into 360° contact with the splice;

compressing the wrapped flexible wrapper in a manner to force the water resistant material into voids in the splice; and securing the closure to the signal transmission device.

2. The method of claim 1 wherein the flexible wrapper is water resistant.

3. The method of claim 1 wherein the flexible wrapper is water impermeable.

4. The method of claim 1 wherein the flexible wrapper comprises paper, plastic or rubber.

5. The method of claim 1 wherein the flexible wrapper comprises an adhesive material at its edge.

6. The method of claim 1 wherein water resistant material is retained within a delivery device including a porous medium.

7. The method of claim 1 wherein the porous medium is open-celled.

8. The method of claim 1 wherein the porous medium is compressible.

9. The method of claim 1 wherein the delivery device comprises one or more layers of the porous medium.

10. The method of claim 1 wherein the porous medium has a porosity of between about 4 to about 25 pores per square inch.

11. The method of claim 1 wherein the water resistant material is selected from the group consisting of a gel, a grease, an encapsulant and a potting material.

12. The method of claim 1 wherein the water resistant material is water impermeable.

13. The method of claim 1 wherein the water resistant material is a self-healing conformable gel.

14. The method of claim 1 wherein the water resistant material fills about 80% of the delivery device.

15. The method of claim 1 wherein the delivery device comprises a top surface that is substantially free of the water resistant material.

* * * * *